Feb. 5, 1935.  T. GLEN, JR  1,990,026

COMBINED DUST PAN AND CONTAINER

Filed Aug. 22, 1932

INVENTOR,
Thomas Glen Jun'
By his Attorney.
Marks & Clerk

Patented Feb. 5, 1935

1,990,026

UNITED STATES PATENT OFFICE 1,990,026

COMBINED DUST PAN AND CONTAINER

Thomas Glen, Jr., Coogee, New South Wales, Australia, assignor of one-half to Muriel Alice Bowra, Randwick, New South Wales, Australia Application August 22, 1932, Serial No. 629,971

2 Claims. (Cl. 65—20)

According to my invention a dust pan is constructed in such manner that it fits into a container which is removably connected to the handle of a broom.

The back of the dust pan forms a closure for the open top of the container which is thereby closed to prevent the escape of dust deposited therein by the dust pan.

A socket clamped to the broom handle has a slot or recess to receive a tongue projecting from the container which thereby is readily disconnectable from the handle.

An embodiment of the invention is illustrated in the accompanying drawing wherein:—

Figure 1:
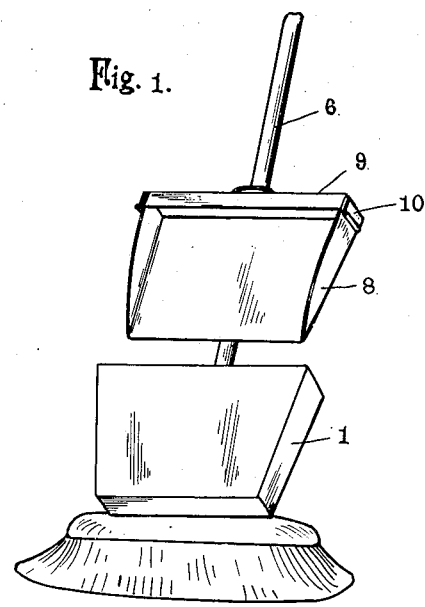
Fig. 1 is a perspective view.
Figure 2:
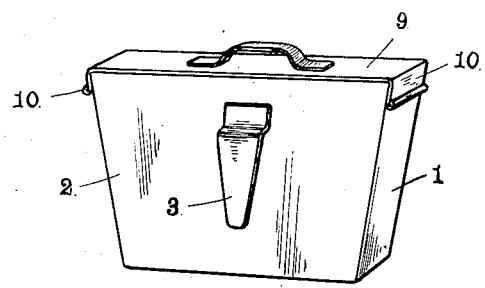
Fig. 2 is a similar view of the rear of the container.
Figure 3:
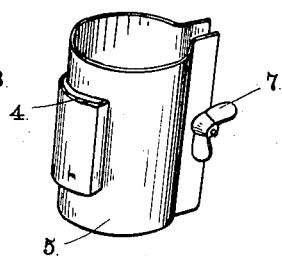

Fig. 3 a view of a clamping socket.

The container 1 is of sheet metal and has upon its back 2 a projecting tongue 3 which fits into a recess 4 in a socket 5 secured upon the broom handle 6 by a clamping nut 7.

A dust pan 8 is fashioned to pass into the container which tapers towards its lower end.

The back wall 9 of the dust pan forms a closure for the open end of the container, and has at each end a projecting wing 10 which, when the dust pan is within the container, fit closely against the sides thereof and prevent escape of dust passed into the container from the dust pan.

I claim:

1. A dust pan and dust container attachment for brooms comprising a dust container formed to conform to the shape of a dust pan and closed on all sides except across its top, clamping means operably connected with the back of the container adapted for engagement with the broom handle for removably holding the container in position on the broom handle and securing it against movement thereon and including a tongue and socket connection, and a dust pan adapted to be inserted into the container through the open top thereof, removably engaging said container and acting as a secure closure therefor.

2. In a device of the character described, a container one end of which is open, a dust pan for removable and slidable engagement with the open end of the container including a back forming a closure for the open end of the container when the dust pan is passed thereinto, and clips extending angularly from the back of the dust pan adapted for yielding engagement with the outer surface of the sides of the container for holding the dust pan against accidental displacement.

THOMAS GLEN, Jun.